(12) United States Patent
Nam et al.

(10) Patent No.: US 11,273,425 B2
(45) Date of Patent: Mar. 15, 2022

(54) DEHYDROGENATION CHEMICAL REACTOR

(71) Applicants: HYUNDAI MOTOR COMPANY, Seoul (KR); KIA MOTORS CORPORATION, Seoul (KR); Kookmin University Industry Academy Cooperation Foundation, Seoul (KR)

(72) Inventors: Dong Hoon Nam, Suwon-si (KR); Kyung Moon Lee, Uiwang-si (KR); Hoon Mo Park, Seongnam-si (KR); Young-Jin Cho, Gimhae-si (KR); Byeong Soo Shin, Uiwang-si (KR); Hee Joon Lee, Seoul (KR); Seon Jeong Huh, Seoul (KR)

(73) Assignees: HYUNDAI MOTOR COMPANY, Seoul (KR); KIA MOTORS CORPORATION, Seoul (KR); Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 17/034,903

(22) Filed: Sep. 28, 2020

(65) Prior Publication Data
US 2021/0299627 A1 Sep. 30, 2021

(30) Foreign Application Priority Data
Mar. 24, 2020 (KR) .......................... 10-2020-0035656

(51) Int. Cl.
*B01J 19/24* (2006.01)
*B01J 19/00* (2006.01)
(Continued)

(52) U.S. Cl.
CPC ......... *B01J 16/005* (2013.01); *B01J 19/0013* (2013.01); *B01J 19/24* (2013.01);
(Continued)

(58) Field of Classification Search
CPC ............... B01J 19/1812; B01J 19/0066; B01J 19/0073; C10G 1/04; C10G 2300/1003;
(Continued)

(56) References Cited

U.S. PATENT DOCUMENTS 9,231,264 B2 * 1/2016 Langan ..................... C01B 3/04

FOREIGN PATENT DOCUMENTS

JP 2010285312 A * 12/2010

OTHER PUBLICATIONS

Machine translation for JP-2010-285312 A (Year: 2010).*

* cited by examiner

*Primary Examiner* — Huy Tram Nguyen
(74) *Attorney, Agent, or Firm* — Lempia Summerfield Katz LLC

(57) ABSTRACT

A dehydrogenation chemical reactor includes: a housing; a catalyst part made of a thermally conductive material and disposed in the housing, where the catalyst part has a panel shape, and a catalyst is coated on a surface of the catalyst part to separate hydrogen from an organic hydrogen carrier; a heat transfer pipe which is installed to contact the catalyst part, and conducts latent heat to the catalyst part while pressurized and saturated fluid is supplied therein; and an organic hydrogen carrier line which is connected to the housing to form a passage in which the organic hydrogen carrier is introduced into the housing, contacts the catalyst part to separate hydrogen, and then is discharged.

12 Claims, 4 Drawing Sheets

(51) Int. Cl.
 *B01J 16/00* (2006.01)
 *C01B 3/00* (2006.01)
 *C01B 3/26* (2006.01)
(52) U.S. Cl.
 CPC .............. *C01B 3/0015* (2013.01); *C01B 3/26* (2013.01); *B01J 2219/00081* (2013.01)
(58) Field of Classification Search
 CPC ........ C10G 2300/1014; C10G 2400/04; C10L 1/08; C10L 2200/0469; C10L 2270/026
 USPC ....................................................... 422/220
 See application file for complete search history.

400: 410,420

DEHYDROGENATION CHEMICAL REACTOR

CROSS REFERENCE TO RELATED APPLICATION

The present application claims priority to and the benefit of Korean Patent Application No. 10-2020-0035656, filed on Mar. 24, 2020, the entire contents of which are incorporated herein by reference.

FIELD

The present disclosure relates to a dehydrogenation chemical reactor, which may effectively separate hydrogen from an organic hydrogen carrier.

BACKGROUND

The statements in this section merely provide background information related to the present disclosure and may not constitute prior art.

Securing energy sources with industrial development is becoming an increasingly important issue. Until now, fossil fuel, which is mainly used as an energy source, has a limited reserve, and environmental pollution due to pollutants generated when the fossil fuel burns becomes a social issue.

Hydrogen receives attention as next-generation alternative energy because when used as fuel, the hydrogen has no harmful product to the environment other than a very small amount of nitrogen oxide and is easily stored in various forms such as high pressure gas, liquid gas, or metal hydride.

In order to use hydrogen as an energy source, a technology for the production, storage, and transportation of hydrogen is desired. Particularly, a technology of safely storing and transporting hydrogen is a technology desired for commercializing hydrogen as an alternative energy source. Until now, the method of using liquid organic hydrogen carrier (LOHC) among hydrogen storage technologies has excellent transportation efficiency and economic feasibility.

The LOHC has the advantage in that the LOHC has high hydrogen storage capacity as compared to volume and high hydrogen storage capacity as compared to weight, and repeatedly stores and releases hydrogen. Further, since the LOHC is a liquid organic compound similar to gasoline, the LOHC has the advantage of storing the existing fossil fuel and utilizing the transportation infrastructure without initial significant investment.

The dehydrogenation reaction in which hydrogen is separated from the LOHC is an endothermic reaction, thereby requiring reaction heat. Accordingly, a chemical reactor in which the dehydrogenation reaction occurs needs to maintain a certain temperature through heat supply. We have discovered that when the certain temperature is not maintained, the performance of the chemical reactor decreases. A conventional chemical reactor uses a method for combusting a raw material such as gas and supplying combustion heat in order to supply heat, but there exists a limit of decreasing efficiency because it is difficult to supply the heat uniformly and separate fuel is consumed.

Further, catalyst and the LOHC are desired to contact each other for the dehydrogenation reaction and the chemical reactor is desired to be produced largely in order to increase the contact surface between the catalyst and the LOHC Accordingly, there exists limits such as increased cost and difficult production.

SUMMARY

The present disclosure provides a dehydrogenation chemical reactor, which may supply the reaction heat by using a heat transfer pipe through which the pressurized and saturated fluid flows to constantly maintain the temperature desired for the dehydrogenation reaction, and disposes a catalyst flat plate so as to maintain a minute interval and contacts an organic hydrogen carrier through a separated space to cause a dehydrogenation reaction, thereby increasing a contact surface.

In one form of the present disclosure, a dehydrogenation chemical reactor may include: a housing; a catalyst part made of a thermally conductive material and disposed in the housing, where the catalyst part has a panel shape, and a catalyst is coated on a surface of the catalyst part and configured to separate hydrogen from an organic hydrogen carrier; a heat transfer pipe which is installed to contact the catalyst part, and conducts latent heat to the catalyst part while pressurized and saturated fluid is supplied to flow therein; and an organic hydrogen carrier line which is connected to the housing to form a passage in which the organic hydrogen carrier is introduced into the housing, contacts the catalyst part and discharges the hydrogen.

Further, the organic hydrogen carrier line may be formed with an inlet through which the organic hydrogen carrier is introduced into the housing, and an outlet through which the organic hydrogen carrier is discharged from the housing after hydrogen is separated, and the inlet may be positioned relatively higher than the outlet.

A collecting part is provided at a top of the housing and configured to collect the hydrogen separated from the organic hydrogen carrier.

Further, the pressurized and saturated fluid flowing in the heat transfer pipe may be water ($H_2O$).

Further, the catalyst part may include a plurality of catalyst flat plates, catalyst flat plates of the plurality of catalyst flat plates are respectively coated with a catalyst, and the catalyst flat plates may be stacked on one another at regular intervals.

The organic hydrogen carrier may contact the catalyst through a separation space between the catalyst flat plates to separate hydrogen.

The heat transfer pipe may be bent in a zigzag shape of consecutively penetrating the plurality of catalyst flat plates to conduct latent heat, and the catalyst flat plate may be laminated in a direction in which the saturated fluid flows inside the heat transfer pipe.

The catalyst flat plate may have a flat plate shape formed vertically and the plurality of catalyst flat plates may be horizontally disposed to be spaced at regular intervals apart from each other, and the heat transfer pipe may repeatedly have a shape which extends horizontally and is bent upward after consecutively penetrating the lower portions of the plurality of catalyst flat plates, and extends horizontally after being bent reversely to consecutively penetrate the plurality of catalyst flat plates reversely.

Further, the heat transfer pipe may be composed of a plurality of first pipes and a plurality of second pipes which are disposed at predetermined intervals, and the first pipe may be disposed horizontally with respect to the bottom of the housing, the second pipe may be disposed vertically with respect to the bottom of the housing, and the heat transfer pipe may be formed by repeatedly connecting and combining the first pipe and the second pipe.

An agitator may be provided in the housing, the agitator generating vortex in the organic hydrogen carrier for smooth contact between the organic hydrogen carrier and the catalyst part.

Further, the organic hydrogen carrier may be dodecahydro-9-ethylcarbazole.

Further, a temperature in the housing may be maintained at 180° C. to 350° C.

According to the dehydrogenation chemical reactor of the present disclosure, since the catalyst part is disposed at a minute interval, and the LOHC may react through the separated space, the surface area increases, the manufacturing cost is low, and the performance of the housing as compared to the size is excellent.

Further, by injecting the pressurized saturated fluid into the heat transfer pipe to supply latent heat in order to constantly maintain the temperature desired for the dehydrogenation reaction, it is possible to maintain the uniform temperature even without combustion of the fuel and increase the thermal efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
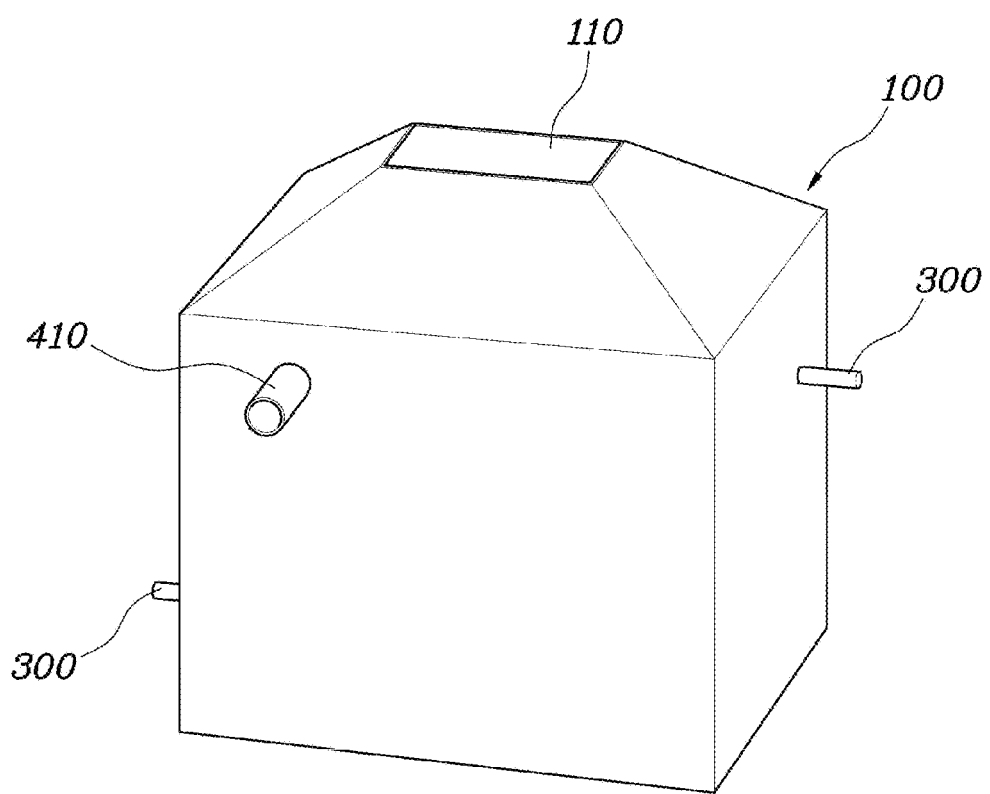
FIG. 1 is a perspective diagram of a dehydrogenation chemical reactor according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Since the forms according to the present disclosure may be variously changed and have various forms, specific forms will be illustrated in the drawings and described in detail in the present specification or application. However, this is not intended to limit the forms according to the concept of the present disclosure to a particular disclosed form, and it should be understood that the present disclosure includes all changes, equivalents, and substitutes included in the spirit and scope of the present disclosure.

Terms such as first and/or second may be used to describe various components, but the components should not be limited by the terms. The terms are used only for the purpose of distinguishing one component from another, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring to" should be interpreted in the same manner.

In order for the reaction in which hydrogen is separated from a liquid organic material to take place, a catalyst and thermal energy are desired. Since the reaction in which hydrogen is separated is an endothermic reaction, the reaction is desired to maintain a certain temperature through heat supply. If the certain temperature is not maintained, separation performance may be lowered, thereby reducing the thermal efficiency of the chemical reactor.

The present disclosure provides a dehydrogenation chemical reactor for efficiently separating hydrogen from an organic hydrogen carrier in which hydrogen is stored. The dehydrogenation chemical reactor according to an exemplary form of the present disclosure is provided with a heat transfer pipe through which saturated fluid flows for uniform heat supply in a housing 100, and a catalyst part 200 may be configured such that a plurality of catalyst flat plates 210 are disposed at regular intervals.

Figure 2:
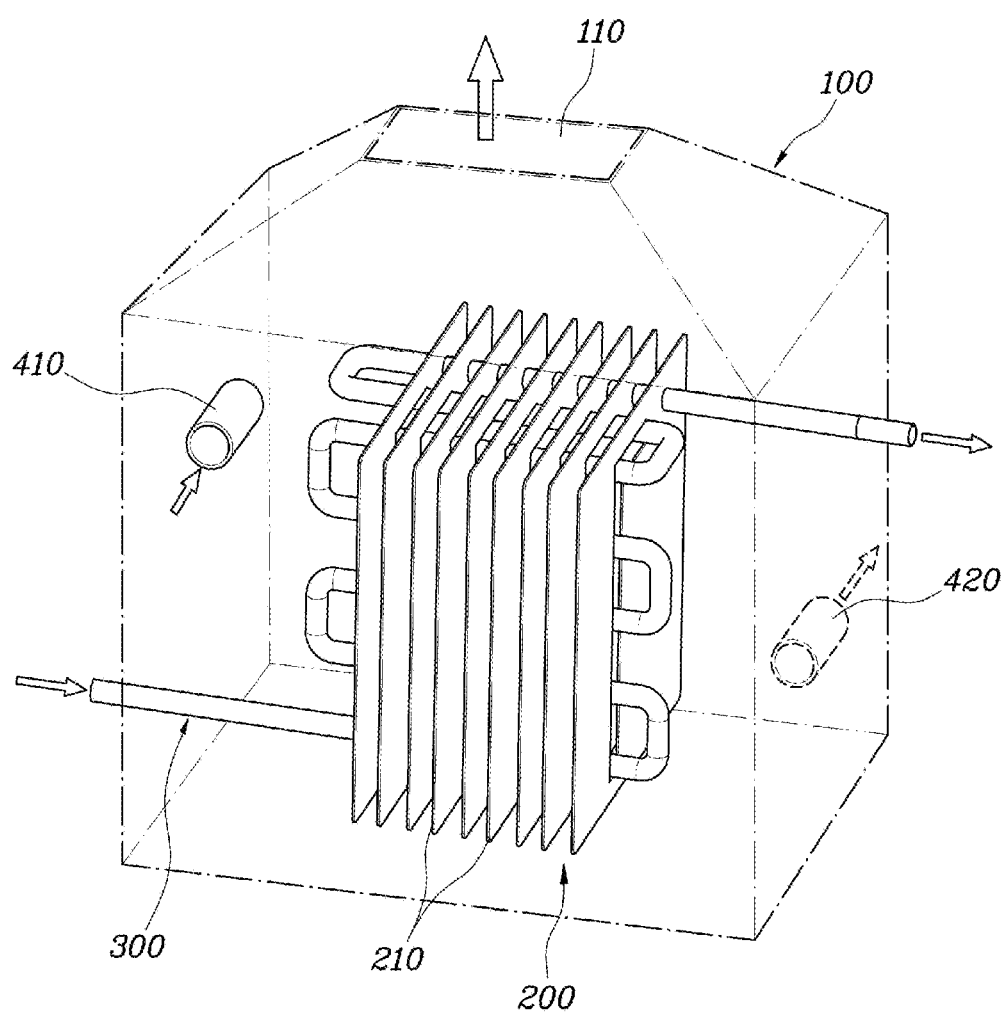
FIG. 2 is a perspective diagram illustrating the inside of the dehydrogenation chemical reactor according to an exemplary form of the present disclosure.

FIG. 1 is a perspective diagram of a dehydrogenation chemical reactor according to an exemplary form of the present disclosure, and FIG. 2 is a perspective diagram illustrating the inside of the dehydrogenation chemical reactor according to an exemplary form of the present disclosure. Referring to FIGS. 1 and 2, the dehydrogenation chemical reactor may be configured to include the housing 100, the catalyst part 200, a heat transfer pipe 300, and an organic hydrogen carrier line 400.

The housing 100 is an outer case of the dehydrogenation chemical reactor, and the dehydrogenation reaction takes place in the housing 100. A collecting part 110 in which hydrogen separated from the organic hydrogen carrier is collected may be provided at the top of the housing 100. Since hydrogen is a gas consisting of two hydrogen atoms, which are the lightest elements and thus is lighter than the atmosphere, hydrogen rises inside the housing 100. In order to collect the rising hydrogen after being separated from the organic hydrogen carrier, the collecting part 110 through which hydrogen may be discharged may be provided at the top of the housing 100. The hydrogen gas collected in the collecting part 110 may be pressurized and stored in a separate hydrogen storage tank.

The catalyst part 200 is a component which causes the dehydrogenation reaction in which hydrogen stored in the organic hydrogen carrier in which hydrogen is stored is separated. The catalyst part 200 is provided in the housing 100, and may have a panel shape of a thermally conductive material. A catalyst for separating hydrogen from the organic hydrogen carrier may be coated on the surface of the catalyst part 200 to cause the dehydrogenation reaction. The surface of the catalyst part 200 may be coated with Pd and $Al_2O_3$.

The heat transfer pipe 300 is a kind of heat generating device for constantly maintaining the internal temperature of the catalyst part 200 and the housing 100. Since the dehydrogenation reaction is an endothermic reaction, reaction heat is required, and the related art combusts a raw material for supplying heat to supply the combustion heat as the reaction heat. However, there is a problem in that the dehydrogenation chemical reactor has a non-uniform temperature distribution therein when the combustion heat is supplied, thereby lowering performance.

The pressurized saturated fluid flows inside the heat transfer pipe 300, and heat may be supplied by latent heat of the saturated fluid. When the liquid is pressurized, the boiling point increases, such that the latent heat is supplied while the pressurized liquid flows through the heat transfer pipe 300. Since the heat may be efficiently supplied to the dehydrogenation chemical reactor by using the latent heat due to a phase change, there is an advantageous effect in maintaining the constant temperature distribution. The temperature inside the housing 100 may be maintained at 180° C. to 350° C. by the heat transfer pipe 300.

The heat transfer pipe 300 may be inserted into the side surface of the housing 100 to penetrate the interior and then discharged to the opposite side surface. The pressurized saturated fluid flows in one direction, and a point discharged outward from the housing 100 may be positioned above a point introduced into the housing 100. That is, as illustrated in FIG. 2, the heat transfer pipe 300 may be disposed so that the saturated fluid is introduced downward from the housing 100 to flow upward. Accordingly, since the organic hydrogen carrier is filled from the bottom of the housing 100, heat energy may be supplied in the order in which the reaction takes place.

The saturated fluid may be various fluids, but when using water-vapor having a large overall heat transfer coefficient, there is an advantage of excellent thermal conductivity. Accordingly, the saturated fluid flowing through the heat transfer pipe 300 of the dehydrogenation chemical reactor may be water ($H_2O$).

The organic hydrogen carrier line 400 is a passage through which the organic hydrogen carrier in which hydrogen is stored is introduced into and discharged from the housing 100. The organic hydrogen carrier line 400 is connected to the housing 100, and may be composed of an inlet 410 through which the organic hydrogen carrier is introduced into the housing 100, and an outlet 420 through which the organic hydrogen carrier is discharged from the housing 100 after hydrogen is separated from the organic hydrogen carrier.

The organic hydrogen carrier used in the dehydrogenation chemical reactor may be generally various storage media capable of storing hydrogen, and may be a liquid organic hydrogen carrier commonly used. Particularly, the organic hydrogen carrier may be dodecahydro-9-ethylcarbazole.

Figure 3:
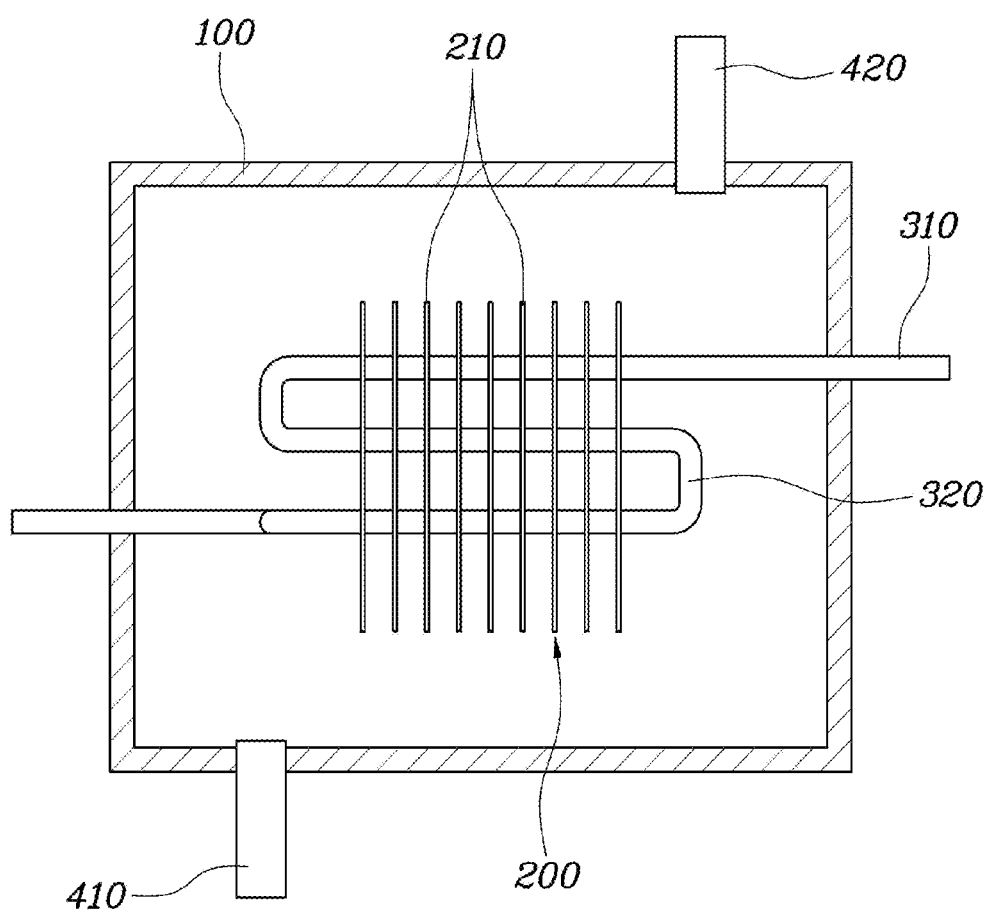
FIG. 3 is a cross-sectional diagram of the dehydrogenation chemical reactor according to an exemplary form of the present disclosure.

FIG. 3 is a cross-sectional diagram of the dehydrogenation chemical reactor according to an exemplary form of the present disclosure.

Referring to FIG. 3, the organic hydrogen carrier line 400 connected to the housing 100 may be configured so that a position of the inlet 410 may be positioned relatively higher than a position of the outlet 420.

The organic hydrogen carrier may be both solid and liquid, but the solid material is heavy and has a slow reaction when hydrogen is stored or separated, thereby making it difficult to commercialize the organic hydrogen carrier and has high uncertainty, such that the liquid material is mainly used. Since the organic hydrogen carrier introduced into the housing 100 of the dehydrogenation chemical reactor is generally liquid, the organic hydrogen carrier is gradually filled from the bottom of the housing 100.

The organic hydrogen carrier introduced into the housing 100 through the inlet 410 is filled from the bottom of the housing 100, reacts with the catalyst part 200 to separate hydrogen, and then is desired to be discharged through the outlet 420, such that the position of the inlet 410 may be positioned relatively higher than the position of the outlet 420.

Figure 4:
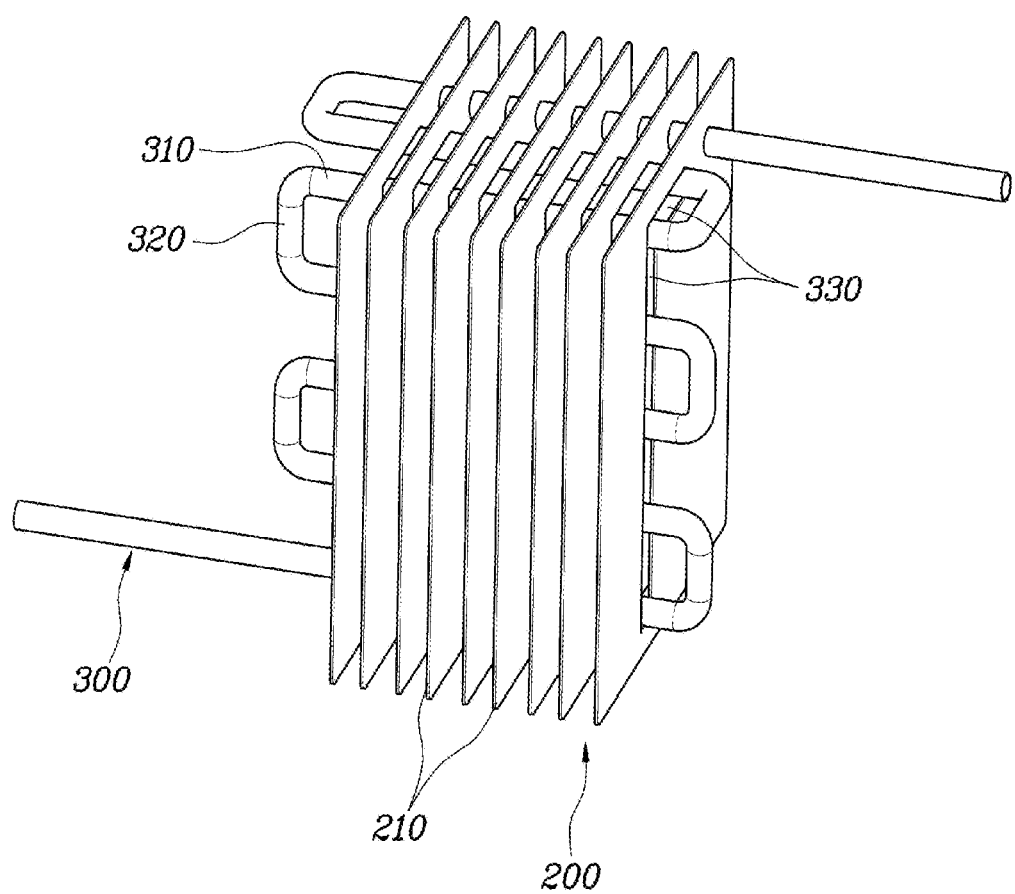
FIG. 4 is a perspective diagram of a catalyst part and a heat transfer pipe of the dehydrogenation chemical reactor according to an exemplary form of the present disclosure.

FIG. 4 is a perspective diagram of the catalyst part 200 and the heat transfer pipe 300 of the dehydrogenation chemical reactor according to an exemplary form of the present disclosure.

Referring to FIG. 4, the catalyst part 200 of the dehydrogenation chemical reactor may be composed of a plurality of catalyst flat plates 210 with a catalyst coated on the surface. The plurality of catalyst flat plates 210 may be laminated to be spaced at regular intervals apart from each other. The interval between the catalyst flat plates 210 may be disposed at minute intervals of micrometers. The organic hydrogen carrier contacts a plurality of catalysts through a separation space between the catalyst flat plates 210, thereby causing the dehydrogenation reaction.

The performance of the dehydrogenation chemical reactor in which the dehydrogenation reaction takes place is determined by the amount of hydrogen production. In order to enhance the performance of the dehydrogenation chemical reactor, the organic hydrogen carrier is desired to be exposed to as many catalyst areas as possible, and to this end, the surface area per unit volume is desired to be large. Accordingly, in order to enhance the performance of the dehydrogenation chemical reactor, the size of the dehydrogenation chemical reactor increases and thus, there is a limit in that the manufacturing cost increases and space constraints occur.

However, in the case of the present disclosure, the organic hydrogen carrier passes between the catalyst flat plates 210 disposed at minute intervals, thereby increasing the contact surface. As a result, the present disclosure may have an advantageous effect in that the contact surface where the catalyst part 200 and the organic hydrogen carrier contact each other increases, thereby decreasing the size of the housing 100 and improving the performance of the dehydrogenation chemical reactor.

Referring to FIG. 4, the heat transfer pipe 300 may be formed by being bent in a zigzag shape of continuously penetrating the plurality of catalyst flat plates 210. The portion where the heat transfer pipe 300 and the catalyst flat plate 210 contact each other increases, such that the latent heat of the pressurized saturated fluid may be effectively conducted to the catalyst part 200. Further, the catalyst flat plate 210 may be laminated in a direction in which the saturated fluid flows in the heat transfer pipe 300. The heat transfer pipe 300 is formed to penetrate the catalyst flat plate 210, and if the catalyst flat plate 210 is laminated in a direction in which the saturated fluid flows, the number of contact points between the heat transfer pipe 300 and the catalyst flat plate 210 increases, thereby being advantageous for maintaining the temperature.

The catalyst flat plate 210 has a flat plate shape which is formed vertically at the bottom of the housing 100, and a plurality of catalyst flat plates 210 may be horizontally disposed to be spaced at regular intervals apart from each other. The heat transfer pipe 300 is connected to one side of the housing 100 and extends horizontally to penetrate the interior to be connected to the other side of the housing 100.

The heat transfer pipe 300 may be bent upward after consecutively penetrating the lower portions of the plurality of catalyst flat plates 210, and may be bent reversely to extend horizontally to consecutively penetrate the plurality of catalyst flat plates 210 reversely. The reverse direction means the direction opposite to the direction of consecutively penetrating the lower portion of the catalyst flat plate 210.

Describing the connection relationship between the catalyst part 200 and the heat transfer pipe 300 in more detail with reference to FIG. 4, the heat transfer pipe 300 may be composed of a first pipe 310 and a second pipe 320 which are disposed at predetermined intervals. A plurality of first pipes 310 and a plurality of second pipes 320 may be provided. The first pipe 310 may be horizontally disposed with respect to the bottom of the housing 100, and the second pipe 320 may be vertically disposed with respect to the bottom of the housing 100. The heat transfer pipe 300 may be formed by repeatedly connecting and combining the first pipe 310 and the second pipe 320. Accordingly, the heat transfer pipe 300 is not limited to the shape illustrated in FIG. 4, and may be configured by a combination of the plurality of first pipes 310 and the plurality of second pipes 320 so as to repeatedly penetrate the catalyst flat plate 210 to increase the number of contact points therebetween.

In this case, the catalyst flat plate 210 may be provided with a slit 330 into which the heat transfer pipe 300 is inserted. The heat transfer pipe 300 is inserted into the slit 330 to facilitate assembly. Further, the heat transfer pipe 300 and the catalyst flat plate 210 are not in full contact, but are formed to be spaced apart from each other by the slit 330, such that the heat energy emitted from the heat transfer pipe 300 may be transferred to the interior of the housing 100 by the slit 330, thereby maintaining the uniform temperature.

Further, an agitator (not illustrated) which generates vortex in the organic hydrogen carrier to facilitate contact between the organic hydrogen carrier and the catalyst part 200 may be provided in the housing 100 of the dehydrogenation chemical reactor according to an exemplary form of the present disclosure. When the organic hydrogen carrier is liquid, a vortex is formed by the agitator (not illustrated), such that the dehydrogenation reaction may easily take place due to smooth contact with the catalyst part 200.

The dehydrogenation chemical reactor according to the present disclosure has the advantage capable of efficiently separating hydrogen from the organic hydrogen carrier by the configuration such as the arrangement of the catalyst part 200, the supply of the heat energy using the pressurized saturated fluid, and the shape of the heat transfer pipe 300. Further, the dehydrogenation chemical reactor may be applied while using the existing infrastructure as it is, thereby also reducing the costs for constructing the system. By transporting the organic hydrogen carrier in which hydrogen is stored, separating the hydrogen gas by using the dehydrogenation chemical reactor according to the present disclosure and then supplying hydrogen to a hydrogen vehicle or a supplier desiring hydrogen, it is possible to stably supply hydrogen.

As described above, while the exemplary forms of the present disclosure have been illustrated and described, it will be apparent to those skilled in the art that the present disclosure may be variously improved and changed within the limitation which does not depart from the technical spirit of the present disclosure.

What is claimed is:

1. A dehydrogenation chemical reactor comprising:
   a housing;
   a catalyst part made of a thermally conductive material and disposed in the housing, wherein the catalyst part has a panel shape, and a catalyst is coated on a surface of the catalyst part and configured to separate hydrogen from an organic hydrogen carrier;
   a heat transfer pipe installed to contact the catalyst part, and configured to conduct latent heat to the catalyst part while pressurized and saturated fluid is supplied therein; and
   an organic hydrogen carrier line connected to the housing and configured to form a passage in which the organic hydrogen carrier is introduced into the housing, contacts the catalyst part to separate hydrogen, and then is discharged.

2. The dehydrogenation chemical reactor according to claim 1,
   wherein the organic hydrogen carrier line includes:
   an inlet through which the organic hydrogen carrier is introduced into the housing; and
   an outlet through which the organic hydrogen carrier is discharged from the housing after hydrogen is separated, and
   wherein the inlet is positioned higher than the outlet.

3. The dehydrogenation chemical reactor according to claim 1,
   wherein a collecting part is provided at a top of the housing and configured to collect the hydrogen separated from the organic hydrogen carrier.

4. The dehydrogenation chemical reactor according to claim 1,
   wherein the pressurized and saturated fluid flowing in the heat transfer pipe is water.

5. The dehydrogenation chemical reactor according to claim 1,
   wherein:
   the catalyst part includes a plurality of catalyst flat plates;
   catalyst flat plates of the plurality of catalyst flat plates are respectively coated with a catalyst; and
   the catalyst flat plates are stacked on one another at regular intervals.

6. The dehydrogenation chemical reactor according to claim 5,
   wherein the organic hydrogen carrier is configured to contact the catalyst through a separation space between the catalyst flat plates to separate hydrogen.

7. The dehydrogenation chemical reactor according to claim 5,
   wherein the heat transfer pipe is bent in a zigzag shape of consecutively penetrating the plurality of catalyst flat plates to conduct latent heat, and
   wherein the catalyst flat plates are stacked in a direction in which the pressurized and saturated fluid flows inside the heat transfer pipe.

8. The dehydrogenation chemical reactor according to claim 7,
   wherein:
   the catalyst flat plates of the plurality of catalyst flat plates are horizontally disposed at regular intervals to be spaced apart from each other, and
   the heat transfer pipe is configured to: extend horizontally and bent upward after consecutively penetrating lower portions of the catalyst flat plates, and extend horizontally after being bent reversely to consecutively penetrate the catalyst flat plates reversely.

9. The dehydrogenation chemical reactor according to claim 1,
wherein: the heat transfer pipe includes a plurality of first pipes and a plurality of second pipes, which are disposed at predetermined intervals;
the plurality of first pipes is disposed horizontally with respect to a bottom of the housing, the plurality of second pipes is disposed vertically with respect to the bottom of the housing; and
the heat transfer pipe is formed by repeatedly connecting first pipes of the plurality of first pipes to second pipes of the plurality of second pipes.

10. The dehydrogenation chemical reactor according to claim 1,
wherein an agitator is provided in the housing, and the agitator is configured to generate vortex in the organic hydrogen carrier for a smooth contact between the organic hydrogen carrier and the catalyst part.

11. The dehydrogenation chemical reactor according to claim 1,
wherein the organic hydrogen carrier is dodecahydro-9-ethylcarbazole.

12. The dehydrogenation chemical reactor according to claim 1,
wherein a temperature in the housing is maintained at 180° C. to 350° C.

* * * * *